United States Patent
Stirling-Gallacher et al.

(10) Patent No.: US 10,111,230 B2
(45) Date of Patent: Oct. 23, 2018

(54) SYSTEM AND METHOD FOR INTERFERENCE COORDINATION IN CELLULAR MILLIMETER WAVE COMMUNICATIONS SYSTEMS

(71) Applicant: Futurewei Technologies, Inc., Plano, TX (US)

(72) Inventors: Richard Stirling-Gallacher, San Diego, CA (US); Lili Zhang, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/610,306

(22) Filed: May 31, 2017

(65) Prior Publication Data

US 2017/0273065 A1  Sep. 21, 2017

Related U.S. Application Data

(63) Continuation of application No. 14/941,243, filed on Nov. 13, 2015, now abandoned.
(Continued)

(51) Int. Cl.
*H04B 7/00* (2006.01)
*H04W 72/04* (2009.01)
(Continued)

(52) U.S. Cl.
CPC ......... *H04W 72/046* (2013.01); *H04L 5/0073* (2013.01); *H04L 5/0085* (2013.01);
(Continued)

(58) Field of Classification Search
CPC ............. H04W 72/046; H04W 72/082; H04W 72/0446; H04W 72/1226; H04L 5/0073; H04L 5/0085; H04L 5/0092; H04L 5/14
(Continued)

(56) References Cited

U.S. PATENT DOCUMENTS

| | | | |
|---|---|---|---|
| 4,554,668 A | * | 11/1985 | Deman ................ H04B 1/7143 375/133 |
| 2007/0274272 A1 | * | 11/2007 | Joshi ..................... H04L 1/0001 370/338 |

(Continued)

FOREIGN PATENT DOCUMENTS

WO    2014109797 A1    7/2014

OTHER PUBLICATIONS

"3rd Generation Partnership Project; Technical Specification Group Radio Access Network; Evolved Universal Terrestrial Radio Access (E-UTRA); Further enhancements to LTE Time Division Duplex (TDD); for Downlink-Uplink (DL-UL) interface management and traffic adaptation (Release 11)," 3GPP TR 36.828 V11.0.0, Technical Report, Jun. 2012, 109 pages.

*Primary Examiner* — Thai Hoang
(74) *Attorney, Agent, or Firm* — Slater Matsil, LLP

(57) ABSTRACT

A method for communicating in a communications system using beamformed transmissions includes blanking an interference antenna beam out of a plurality of available antenna beams that one of causes interference to and receives interference from at least one neighboring base station during a conflict time interval of a frame, wherein the blanking is in accordance with configuration information comprising frame configuration information received from the at least one neighboring base station and frame configuration information of a serving base station (SBS), thereby producing a plurality of candidate antenna beams, scheduling communications opportunities for user equipments (UEs) in the conflict time interval on the plurality of candidate antenna beams, and communicating with scheduled UEs using the communications opportunities.

29 Claims, 16 Drawing Sheets

Related U.S. Application Data

(60) Provisional application No. 62/094,873, filed on Dec. 19, 2014.

(51) Int. Cl.
| | | |
|---|---|---|
| *H04W 72/12* | (2009.01) | |
| *H04L 5/14* | (2006.01) | |
| *H04L 5/00* | (2006.01) | |
| *H04W 72/08* | (2009.01) | |
| *H04W 16/28* | (2009.01) | |
| *H04W 88/08* | (2009.01) | |
| *H04W 92/20* | (2009.01) | |

(52) U.S. Cl.
CPC .............. *H04L 5/0092* (2013.01); *H04L 5/14* (2013.01); *H04W 72/0446* (2013.01); *H04W 72/082* (2013.01); *H04W 72/1226* (2013.01); *H04L 5/1469* (2013.01); *H04W 16/28* (2013.01); *H04W 72/1278* (2013.01); *H04W 88/08* (2013.01); *H04W 92/20* (2013.01)

(58) Field of Classification Search
USPC ... 455/500–501, 63.1, 63.2, 63.4, 65, 67.13, 455/114.2, 114.3, 278.1, 279.1, 296, 455/298–299, 303–306; 370/328–330, 370/335–347
See application file for complete search history.

(56) References Cited

U.S. PATENT DOCUMENTS

| | | |
|---|---|---|
| 2012/0315892 A1 | 12/2012 | Chin |
| 2013/0190000 A1 | 7/2013 | Boudreau et al. |
| 2013/0194950 A1 | 8/2013 | Haghighat et al. |
| 2015/0207611 A1* | 7/2015 | Jung ..................... H04J 11/004 370/329 |

* cited by examiner

SYSTEM AND METHOD FOR INTERFERENCE COORDINATION IN CELLULAR MILLIMETER WAVE COMMUNICATIONS SYSTEMS

CROSS-REFERENCE TO RELATED APPLICATIONS

This application is a continuation of U.S. patent application Ser. No. 14/941,243, filed on Nov. 13, 2015, entitled "System and Method for Interference Coordination in Cellular Millimeter Wave Communications Systems", which claims the benefit of U.S. Provisional Application No. 62/094,873, filed on Dec. 19, 2014, entitled "System and Method for Interference Coordination in Cellular Millimeter Wave Communications Systems," which applications are hereby incorporated herein by reference.

TECHNICAL FIELD

The present invention relates to digital communications, and, in particular embodiments, to interference coordination in cellular millimeter wave (mmWave) communications systems.

BACKGROUND

Intercell interference between adjacent cells of a communications system is a significant problem. The intercell interference can dramatically decrease the performance of communications devices in adjacent cells. Since signal power levels typically drop rapidly as distance increases, cells that are widely separated are usually not impacted by intercell interference.

SUMMARY

In accordance with an example embodiment, a method for communicating in a communications system using beamformed transmissions is provided. The method includes blanking, by a serving base station (SBS), an interference antenna beam out of a plurality of available antenna beams that one of causes interference to and receives interference from at least one neighboring base station during a conflict time interval of a frame, wherein the blanking is in accordance with configuration information comprising frame configuration information received from the at least one neighboring base station and frame configuration information of the SBS, thereby producing a plurality of candidate antenna beams, scheduling, by the SBS, communications opportunities for user equipments (UEs) in the conflict time interval on the plurality of candidate antenna beams, and communicating, by the SBS, with scheduled UEs using the communications opportunities.

In accordance with an example embodiment, a method for communicating in a communications system using beamformed transmission is provided. The method includes determining, by a serving base station (SBS), at least one antenna beam from a plurality of antenna beams that one of causes interference to and receives interference from a neighbor base station during a conflict time interval, wherein the determining is in accordance with configuration information including frame configuration information received from the neighboring base station and frame configuration information of the SBS, eliminating, by the SBS, the at least one antenna beam from the plurality of antenna beams, thereby producing a plurality of candidate antenna beams, scheduling, by the SBS, user equipments (UEs) using the plurality of candidate antenna beams, and communicating, by the SBS, with scheduled UEs using a subset of the plurality of candidate antenna beams.

In accordance with an example embodiment, a serving base station (SBS) is provided. The SBS includes a blanking unit, a scheduler operatively coupled to the blanking unit, and a communications interface operatively coupled to the scheduler. The blanking unit blanks an interference antenna beam out of a plurality of available antenna beams that one of causes interference to and receives interference from at least one neighboring base station during a conflict time interval of a frame, wherein the blanking is in accordance with configuration information comprising frame configuration information received from the at least one neighboring base station and frame configuration information of the SBS, thereby producing a plurality of candidate antenna beams. The scheduler schedules communications opportunities for user equipments (UEs) in the conflict time interval on the plurality of candidate antenna beams. The communications interface communicates with scheduled UEs using the communications opportunities.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of example embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

Figure 1:
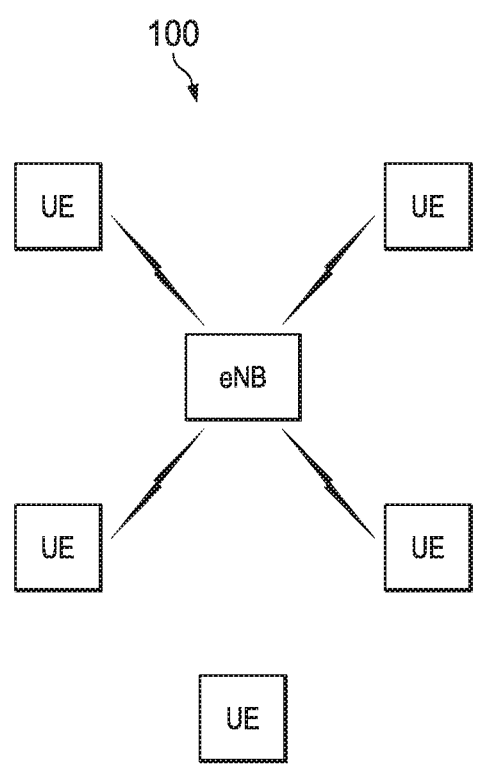
FIG. 1 illustrates example communications system in accordance with example embodiments presented herein.

FIG. 1 illustrates an example communications system 100. Communications system 100 includes an evolved NodeB (eNB) serving a plurality of user equipments (UEs). In a first operating mode, transmissions for UEs as well as transmissions by UEs pass through the eNB. The eNB allocates network resources for the transmissions to or from the UEs. eNBs may also be commonly referred to as base stations, NodeBs, remote radio heads, access points, and the like, while UEs may also be commonly referred to as mobiles, mobile stations, terminals, subscribers, users, and the like. A base station (or an eNB, NodeB, remote radio head, access point, transmission point, and so on) that is serving one or more UEs may be referred to as a serving base station (SBS). A transmission point may be used to refer to any device capable of transmitting. Therefore, transmission points may refer to eNBs, base stations, NodeBs, remote radio heads, access points, UEs, mobiles, mobile stations, terminals, subscribers, users, and the like.

A cell is a commonly used term that refers to a coverage area of an eNB. Typically, a cell is served by one or more sectors of a sectorized antenna of the eNB. Hence, the coverage area of the eNB includes a cell partitioned into a plurality of sectors. As an illustrative example, in a scenario where an eNB uses a three-sector antenna system, the cell of the eNB may be divided into three sectors, with each sector being covered by a separate antenna (with an example beam width of 120 degrees) or a separate part of the total antenna system. As another illustrative example, in a scenario where an eNB uses a six-sector antenna system (where each antenna may cover a 60 degree sector, for example), the cell of the eNB may be divided into six sectors or three sectors, with each sector being covered by one or two antennas or parts sectors of the antenna system respectively.

According to an example embodiment, a technique that minimizes intercell interference between adjacent cells that are using millimeter wave (mmWave) transmission (and therefore, always using beamforming) when different time division duplexed (TDD) frame configurations (i.e., arrangements of uplink and downlink slots) are used in adjacent cells (dynamic TDD) is presented.

Traditional state of the art techniques for implementing dynamic TDD include clustering the TDD configurations of adjacent cells so that they use the same TDD configuration and interference between uplink and downlink slots are eliminated. A drawback of these techniques is that each cell in a cluster may not use the optimum TDD configuration for its specific uplink/downlink load condition and cell capacity may be reduced.

According to an example embodiment, an eNB associated with a cell is permitted to select and/or use its optimal TDD frame configuration. The eNB may optimize its TDD frame configuration to meet its own uplink/downlink load condition. Therefore, the capacity of each cell is optimized. Furthermore, each eNB is informed of its neighbors' TDD frame configurations. The information regarding the neighbors' TDD frame configurations may be used by the eNB to control beamforming scheduling decisions in its own cell to minimize intercell interference. In general, a frame is divided up into a plurality of subframes or time intervals, hence a time interval may refer to a subframe or a subset of a frame.

According to an example embodiment, to help eliminate potential high interference (especially eNB to eNB interference) when adjacent eNBs are transmitting in opposite link directions (i.e., uplink vs downlink) in certain time slots, each eNB avoids scheduling UEs that require beams to be pointed in certain high interference directions. In other words, to minimize interference, when adjacent cells are using different subframes (D or U), interference is minimized by blanking (or blocking the use of) certain beam directions at the cells for transmitting (transmit beam blanking), receiving (receive beam blanking), or both (transmit and receive beam blanking). The blanked beams may be part of a fixed set or may be dynamically selected based on beam indexing information received from adjacent eNBs. The beams may be fully blanked or almost blanked.

According to an example embodiment, the techniques presented herein are used to minimize interference for both 2-dimensional beamforming (i.e., azimuth only) and 3-dimensional beamforming (i.e., azimuth and elevation).

According to an example embodiment, the cell capacity of each cell is optimized by allowing each eNB to determine the TDD frame configurations for its own cell. Each eNB is also informed of the TDD frame configuration of its neighbor eNBs. In other words, the TDD frame configuration of each cell is shared with other eNBs. Each eNB compares the chosen TDD frame format of its neighbor with its own frame format and determines which subframes may be subjected to interference or may cause interference from/to the neighboring eNB. To mitigate such interference, angular beam blanking is used.

According to an example embodiment, to communicate a chosen TDD frame configuration (and possibly additional information, e.g., beam indices, blanking flags, etc.) from one sector of one eNB to an adjacent sector of a neighboring eNB, the beam directions that are normally transmit (or receive) beams but which have been blanked may be used for eNB to eNB communications. The eNB to eNB communications may be performed inband (using the S subframe and TDD toggling, for example) or in an out of band fashion.

Figure 2:
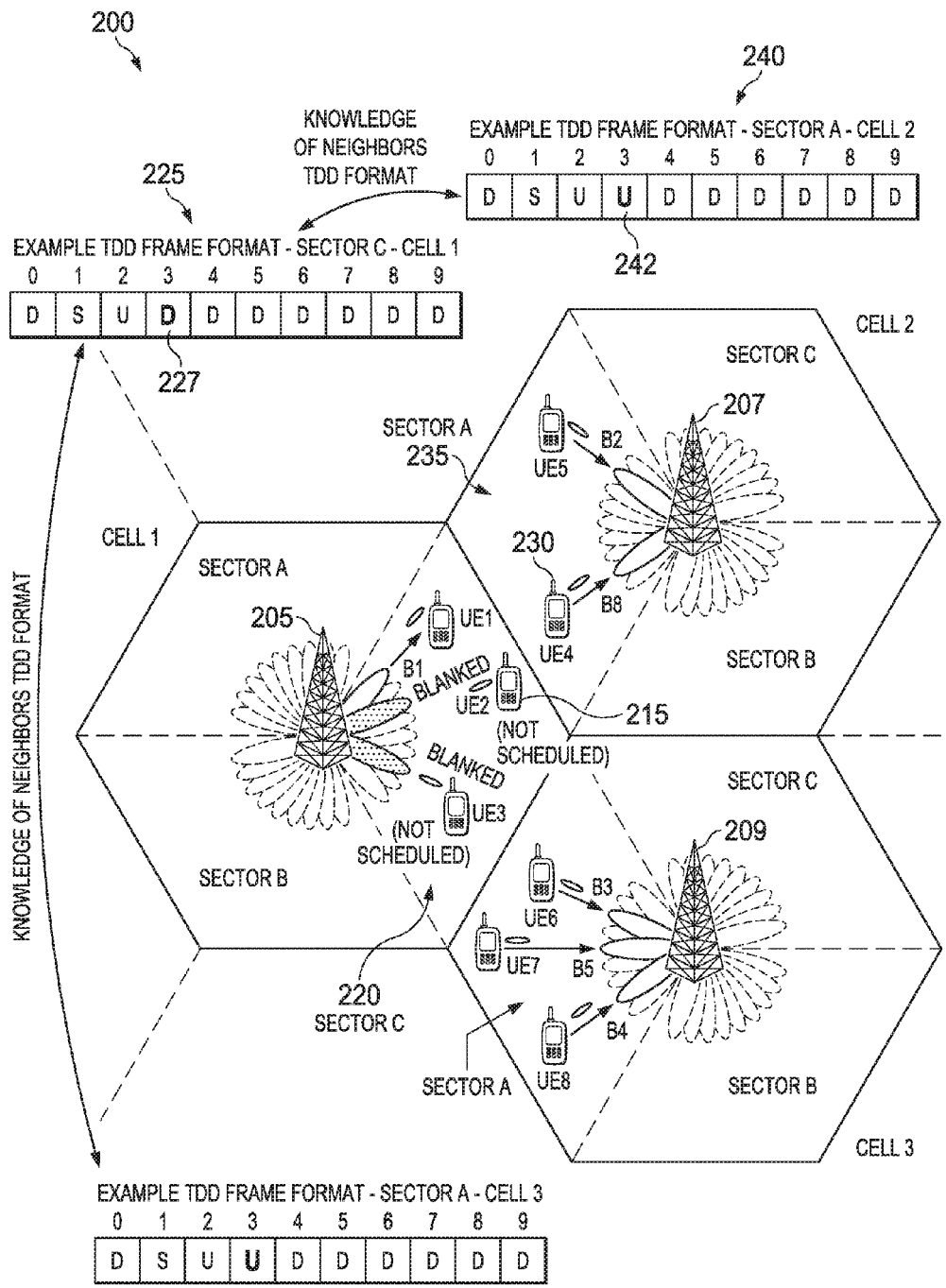
FIG. 2 illustrates a portion of an example communications system highlighting transmit beam blanking in accordance with example embodiments presented herein.

FIG. 2 illustrates a portion of an example communications system 200 highlighting transmit beam blanking. Detailed descriptions of communications system 200 and transmit beam blanking are provided below. Communications system 200 includes eNBs 205, 207, and 209, with each serving a plurality of UEs. As an illustrative example, a downlink transmission for UE2 215 operating in sector C 220 of cell 1 operated by eNB 205 during subframe 3 227 (shown in example TDD frame format 225 for sector C 220 of eNB 205) is not scheduled (blanked) since there is an uplink reception of a transmission by UE4 230 operating in sector A 235 of cell 2 by eNB 207 during the same time period (subframe 3) 242 (shown in example TDD frame format 240 for sector A 235 of eNB 207).

For discussion purposes, a mmWave cellular system is a system in which both the eNB (or equivalently a base station, NodeB, controller, communications controller, remote radio head, and the like) and the UE (or equivalently mobile, mobile station, terminal, subscriber, user, and the like) are using beamforming of some form to overcome path loss at mmWave frequencies. The mmWave system operates in TDD mode. Although the discussion focuses on mmWave cellular systems, systems operating at other frequencies may also make use and benefit from the example embodiments discussed herein.

In current 3GPP LTE communications systems, there are a number of different frame configurations permitted for TDD mode. The table A shown below illustrates some example TDD frame configurations.

TABLE A

Example TDD frame configurations.

| UPLINK-DOWNLINK CONFIGURATION | DOWNLINK TO UPLINK SWITCH PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 MS | D | S | U | U | U | D | S | U | U | U |
| 1 | 5 MS | D | S | U | U | D | D | S | U | U | D |
| 2 | 5 MS | D | S | U | D | D | D | S | U | D | D |
| 3 | 10 MS | D | S | U | U | U | D | D | D | D | D |
| 4 | 10 MS | D | S | U | U | D | D | D | D | D | D |
| 5 | 10 MS | D | S | U | D | D | D | D | D | D | D |
| 6 | 5 MS | D | S | U | U | U | D | S | U | U | D | where D=downlink subframe (1 ms), U=uplink subframe (1 ms), and S=special subframe (1 ms). An S subframe is always between a D subframe and a U subframe for UE timing purposes.

For an mmWave cellular system, a set of frame configurations may also be used. They may differ from the example frame configurations shown in the table A for 3GPP LTE communications systems. Alternatively, they may be the same as the example frame configurations shown in the table A for 3GPP LTE communications systems. The discussion presented herein will use the set of frame configurations for 3GPP LTE communications systems. However, the use of the set of frame configurations for 3GPP LTE communications systems should not be construed as being limiting to either the scope or the spirit of the example embodiments. Interference issues that occur when different mmWave cells use different TDD frame configurations are addressed by example embodiments presented herein.

Figure 3:
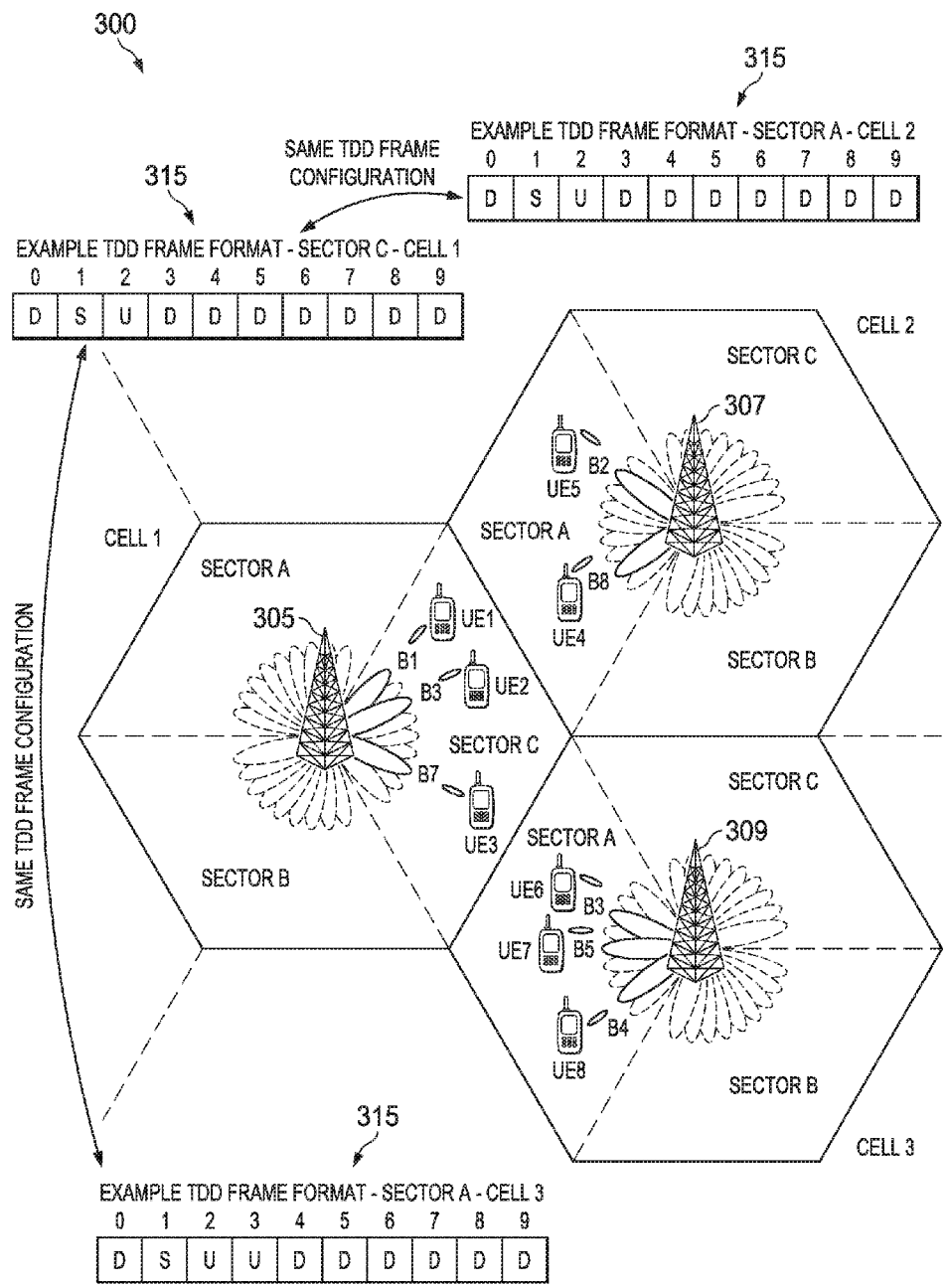
FIG. 3 illustrates a portion of an example mmWave communications system in accordance with example embodiments presented herein.

FIG. 3 illustrates a portion of an example mmWave communications system 300. Cells of communications system 300 are split into sectors. mmWave communications system 300 includes a plurality of eNBs, 305, 307, and 309, each serving a plurality of UEs. Intercell interference at a sector of a cell or a cell of an eNB arises from adjacent sectors and/or cells of adjacent eNBs. Each eNB serves its UEs via beamforming. Only one beam per UE is shown. Multiple beams per UE may be used for higher rank transmission (e.g., multiple input multiple output (MIMO) transmission). As shown in FIG. 3, all adjacent sectors use a single TDD frame configuration, i.e., example TDD frame format 315.

Figure 4:
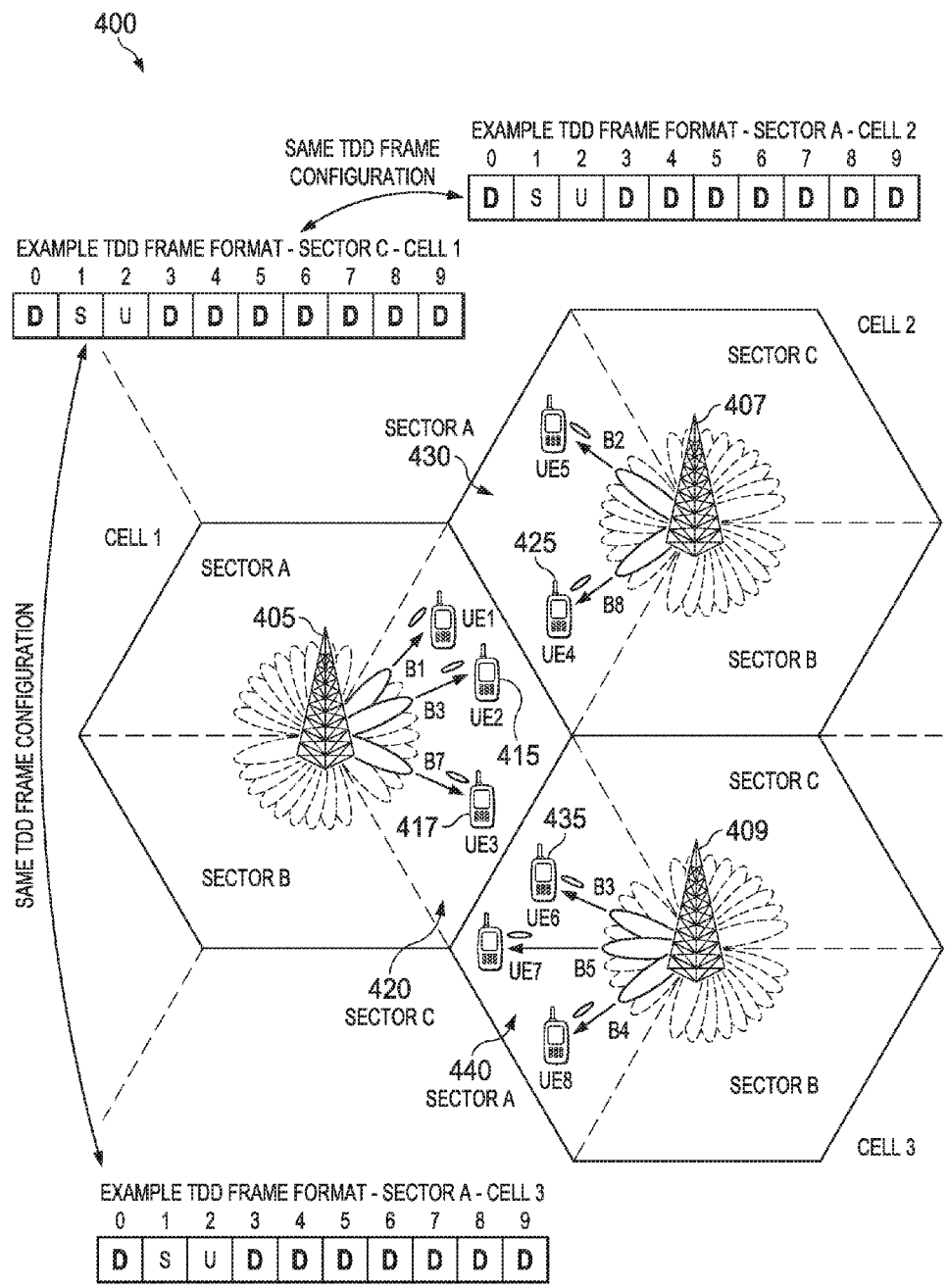
FIG. 4 illustrates a portion of an example mmWave communications system, when adjacent eNBs are using the same frame format and highlights a situation during downlink (D) subframes in accordance with example embodiments presented herein.

FIG. 4 illustrates a portion of an example mmWave communications system 400, when adjacent eNBs are using the same frame format and highlights a situation during downlink (D) subframes. mmWave communications system 400 includes a plurality of eNBs, 405, 407, and 409, each serving a plurality of UEs. As shown in FIG. 4, if UE 2 415 (operating in sector C 420 of cell 1 of eNB 405) and UE 4 425 (operating in sector A 430 of cell 2 of eNB 407) are co-scheduled (i.e., scheduled in the same subframe), they will experience some amount of intercell interference (ICI), but it may be mitigated to some extent by beamforming directional antennas at the UEs. Similarly, if UE 3 417 (operating in sector C 420 of cell 1 of eNB 405) and UE 6 435 (operating in sector A 440 of cell 3 of eNB 409) are co-scheduled, they will also experience some amount of ICI. Due to the use of beamforming, ICI has a flashlight type effect. The flashlight effect refers to the bursty nature of ICI which only occurs at time periods when beam directions of adjacent interfering cells are aligned. It is referred to as the flashlight effect since the interfering beam only interferes UEs in the coverage area (or beam width) in a similar way that a normal visible light flashlight would only illuminate objects in its beam direction. For UEs in the beam, interference may depend upon factors, such as distance to sector or cell edge, as well as a front to back ratio of the UEs' antennas.

Figure 5:
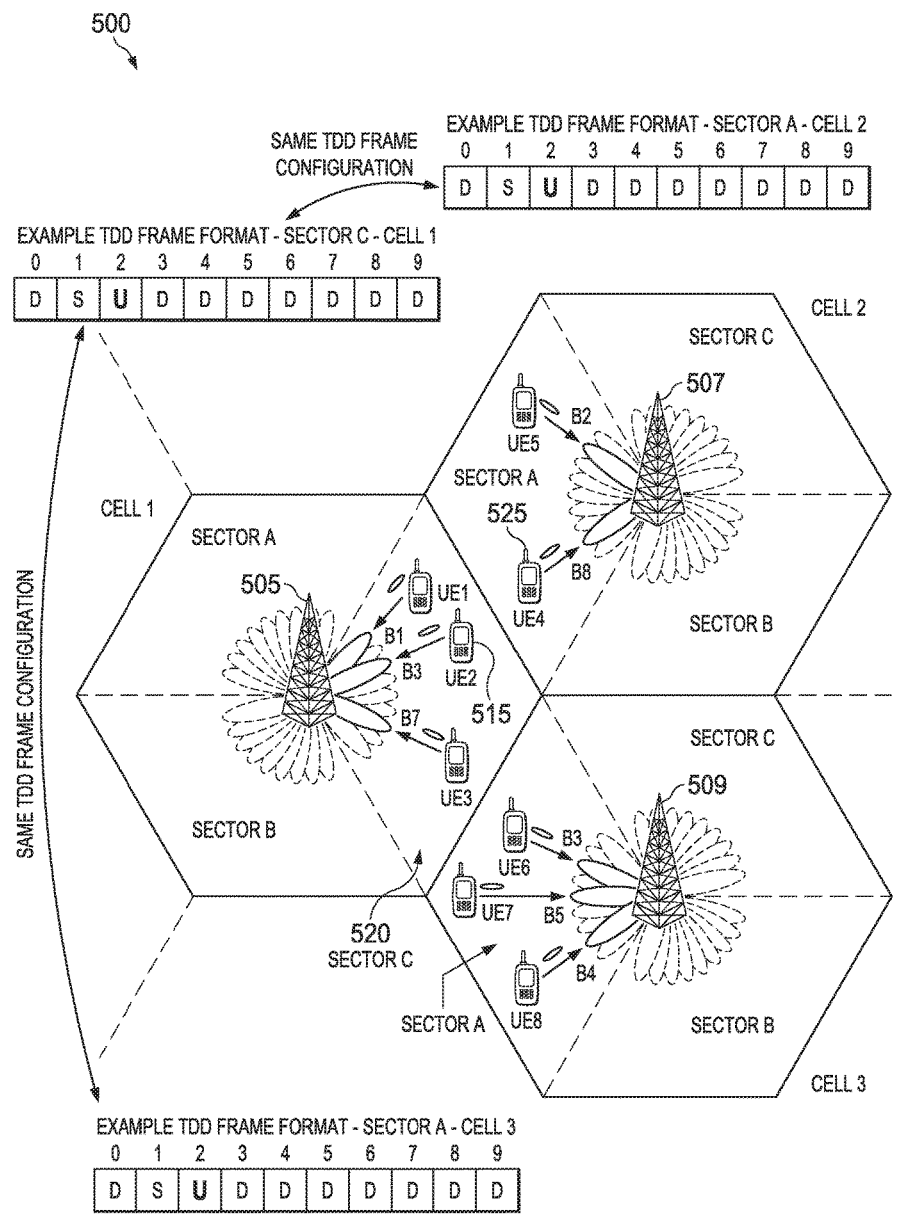
FIG. 5 illustrates a portion of an example mmWave communications system, when adjacent eNBs are using the same frame format and highlights a situation during uplink (U) subframes in accordance with example embodiments presented herein.

FIG. 5 illustrates a portion of an example mmWave communications system 500, when adjacent eNBs are using the same frame format and highlights a situation during uplink (U) subframes. mmWave communications system 500 includes a plurality of eNBs, 505, 507, and 509, each serving a plurality of UEs. Since UEs generally have lower transmit power levels, and their antennas are facing towards their respective serving eNBs, interference received at neighboring eNBs due to transmissions from the UEs is relatively low. As an illustrative example, interference from a transmission by UE 2 515 in sector C 520 of cell 1 of eNB 505 to eNB 507 is likely to be low. The exact level of interference may depend upon factors, such as UE antenna configuration, UE transmit power level, UE distance to sector or cell edge, and the like.

Figure 6:
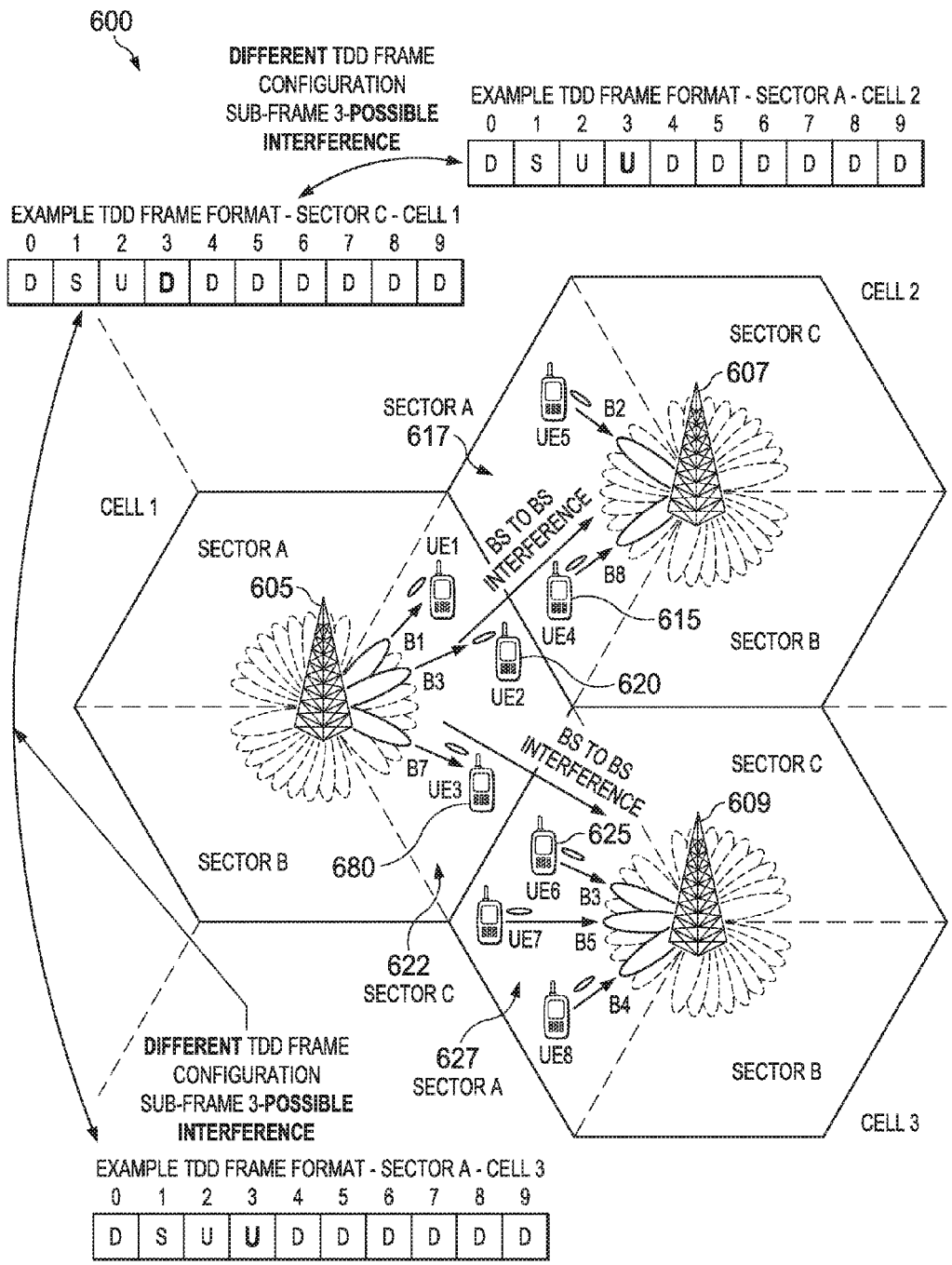
FIG. 6 illustrates a portion of an example mmWave communications system, highlighting different frame configurations at different cells in accordance with example embodiments presented herein.

FIG. 6 illustrates a portion of an example mmWave communications system 600, highlighting different frame configurations at different cells. mmWave communications system 600 includes a plurality of eNBs, 605, 607, and 609, each serving a plurality of UEs. As shown in FIG. 6, different cells in mmWave communications system 600 use different frame configurations. If in subframe 3, UE 4 615 (sector A 617 of cell 2 of eNB 607) makes an uplink transmission and UE 2 620 (sector C 622 of cell 1 of eNB 605) receives a downlink transmission, severe eNB to eNB interference may occur since the transmit beams and the receive beams of the eNBs (eNB 605 to eNB 607) are aligned (i.e., the same or substantially the same orientation) and eNB transmit power is high. A similar situation occurs with UE 6 625 (sector A 627 of cell 3 of eNB 609) and UE 3 630 (sector C 622 of cell 1 of eNB 605). However, if transmit beam and receive beam angle blanking is used, intercell interference may be mitigated. It is noted that UE to UE interference (e.g., UE 4 615 to UE 2 620) may be mitigated due to use of directional antennas at the UEs.

Figure 7:
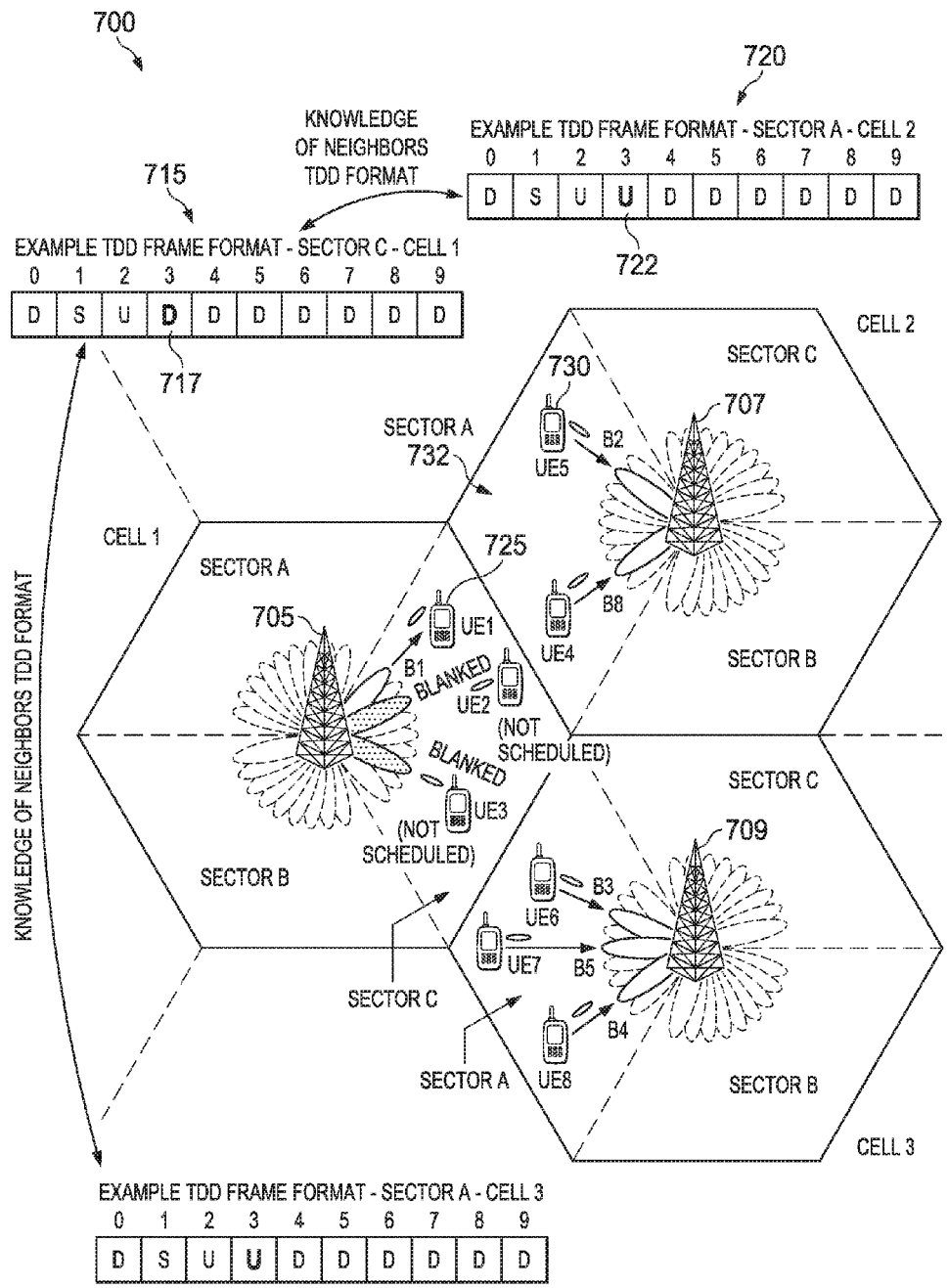
FIG. 7 illustrates a portion of an example mmWave communications system, highlighting transmit beam blanking in accordance with example embodiments presented herein.

FIG. 7 illustrates a portion of an example mmWave communications system 700, highlighting transmit beam blanking. mmWave communications system 700 includes a plurality of eNBs, 705, 707, and 709, each serving a plurality of UEs. According to an example embodiment, transmit beams of eNB sectors are blanked to help mitigate interference. eNBs of sectors are informed of neighboring sectors' frame configurations. The signaling of the frame configurations may be low overhead in order to minimize impact on communications system performance. As an illustrative example, 3 bits (representing 1 of 8 possible frame formats) may be signaled per to ms frame. The eNB may then select the use of certain beam directions (and the scheduling of the UEs served by these beams) based on the frame configurations chosen by eNBs of adjacent sectors for conflict subframe time periods which could cause interference. A conflict subframe is one in which an eNB and an adjacent eNB are using different subframes types (i.e., D and U). The scheduling for a sector's UEs may also be based on data to be transmitted to the UEs as well as scheduling requests received from the UEs. As an illustrative example, if an eNB of a sector wants to use a D (downlink) subframe when an eNB of a neighboring sector is using U (Uplink) subframes (e.g., subframe 3 717 of example TDD frame format 715 and subframe 3 722 of example TDD frame format 720 as shown in FIG. 7), the transmitting eNB of the sector may blank certain transmit beam angles (a subset of a complete set of transmit beams, for example) that may cause interference to neighbor sectors at the receiving eNB. Other transmit beams that have not been blanked may still be used for scheduling UEs (e.g., UE 1 725 may still be scheduled for a downlink transmission as shown in FIG. 7). Other UEs which can be scheduled for transmissions include UE 5 730 (sector A 732 of cell 2 of eNB 707).

Figure 8:
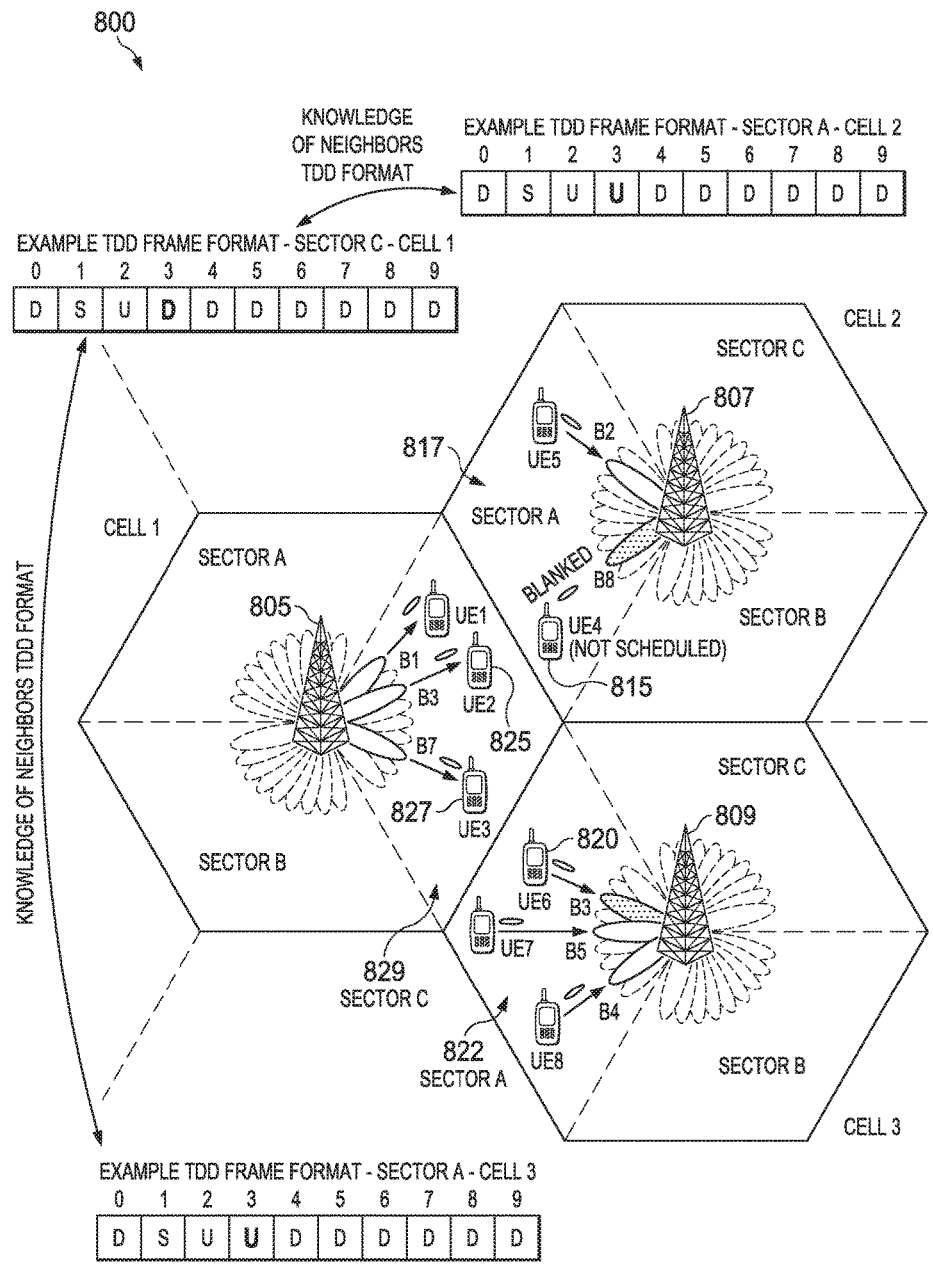
FIG. 8 illustrates a portion of an example mmWave communications system, highlighting receive beam blanking in accordance with example embodiments presented herein.

FIG. 8 illustrates a portion of an example mmWave communications system 800, highlighting receive beam blanking. mmWave communications system 800 includes a plurality of eNBs, 805, 807, and 809, each serving a plurality of UEs. According to an example embodiment, receive beams of sectors are blanked to help mitigate interference. eNBs of sectors are informed of neighboring sectors' frame configurations. An alternative to transmit beam blanking is receive beam blanking. As an illustrative example, if a given sector is using a U subframe when neighboring sectors are using D subframes (conflict subframe), the given sector may blank the use of certain receive beams for the subframe. As shown in FIG. 8, UE 4 815 (sector A 817 of cell 2 of eNB 807) and UE 6 820 (sector A 822 of cell 3 of eNB 809) are not scheduled for reception due to downlink transmissions to UE 2 825 and UE 3 827 of sector C 829 of eNB 805. Receiver beam blanking may allow neighboring sectors to use D subframes to schedule their respective UEs in directions which would otherwise cause eNB to eNB interference. As shown in FIG. 8, UE 2 825 (sector C 829 of cell 1 of eNB 805) and UE 3 (sector C 829 of cell 1 of eNB 805) may be scheduled for downlink transmission.

Figure 9:
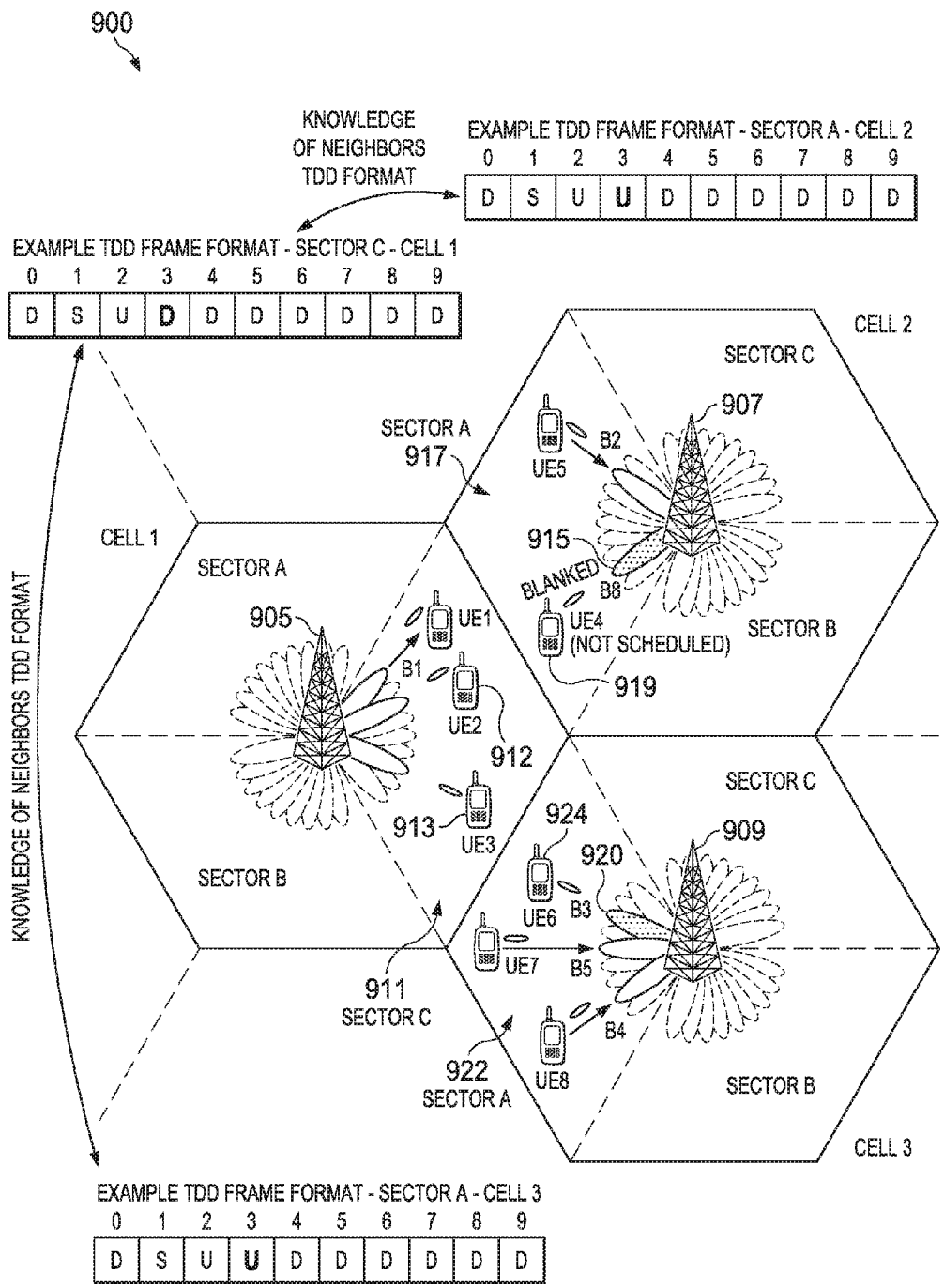
FIG. 9 illustrates a portion of an example mmWave communications system, highlighting transmit beam and receive beam blanking in accordance with example embodiments presented herein.

FIG. 9 illustrates a portion of an example mmWave communications system 900, highlighting transmit beam and receive beam blanking. mmWave communications system 900 includes a plurality of eNBs, 905, 907, and 909, each serving a plurality of UEs. According to an example embodiment, transmit beam and receive beam blanking is performed to help mitigate interference. As an illustrative example, mmWave communications system 900 may select transmit beam blanking over receive beam blanking to reduce overall interference. However, receive beam blanking may be utilized in certain frame configurations, i.e., when there is only one interference subframe and the remaining subframes are U subframes. A decision to select transmit beam blanking or receive beam blanking may be a network-side decision or it may depend on frame format chosen for neighboring cells. As an illustrative example, due to downlink transmissions from eNB 905 in sector C 911 to UE2 912 and UE3 913, beam B8 915 in sector A 917 of eNB 907 is blanked, therefore UE 4 919 is not scheduled, and beam B3 920 of sector A 922 of eNB 909 is blanked, therefore UE 6 924 is not scheduled.

According to an example embodiment, a decision to perform transmit beam and/or receive beam blanking is a fixed network-side decision. Alternatively, the decision may be a dynamic decision based on frame configurations of each sector, its respective neighbors, cell load, and the like. As an illustrative example, a sector that is lightly loaded on the uplink and has other available U subframes in a TDD frame to reschedule its UEs may opt to perform receive frame blanking. As another illustrative example, a cell that is lightly loaded on the downlink and has other available D subframes to reschedule its UEs on the downlink in a TDD frame may opt to perform transmit beam blanking.

Hence, additional signaling that indicates a reported (or estimated) traffic situation (i.e., cell load) may be exchanged between eNBs of adjacent cells and/or sectors so that a more informed decision can be made as to whether transmit beam and/or receive beam blanking should be performed. Depending on how quickly the cell loads change at each cell compared to the rate at which the eNBs can exchange traffic situation information (e.g., load information) may ultimately decide the performance gain of the example embodiments. A dedicated eNB to eNB link is potentially much faster than a traditional X2 link, thereby potentially improving the performance gain. An example technique is described below.

A variety of techniques may be used for exchanging traffic situation information between adjacent cells, but a simple signaling scheme may be based on several observations:

An important aspect is whether each eNB is capable of rescheduling the UEs assigned to a given subframe to another subframe of the same frame if a beam in the given subframe is requested to be blanked; and Another aspect is that any load signaling needs to avoid any further rounds of eNB to eNB communications to help reduce delay. Furthermore, eNBs that are involved need to be aware of the final transmit and/or receive beam blanking decision.

According to an example embodiment, a load signaling scheme to dynamically determine to perform transmitter or receiver beam blanking is as follows:

Each eNB may signal a 1-bit reschedule flag for each subframe (e.g., a "1" means rescheduling is possible and a "0" means rescheduling is not possible, and vice versa) which indicates if the eNB is capable of rescheduling the UE(s) assigned to that subframe or not. The scheduling overhead is therefore only 8 bits per frame.

When both eNBs exchange the TDD frame configuration, the reschedule flags for each subframe are also exchanged. A simple set of rules may be used for "conflict" subframes (i.e., when one eNB is using a D (downlink) subframe while a neighbor eNB is using a U (uplink) subframe for the same subframe) to decide on transmit and/or receive beam blanking.

Example rules for different rescheduling flag case may be:
a. When only one eNB (e.g., eNB A) has a "1" in its reschedule flag for the conflict subframe, then this eNB (eNB A) performs beam blanking. If the conflict subframe for this eNB was a D subframe, then this eNB performs transmit beam blanking, while if the conflict subframe was a U subframe, then this eNB performs receive beam blanking;
b. When both eNBs have a "1" in their respective reschedule flags for the conflict subframe, the eNB which is using a D subframe performs transmit beam blanking to reduce overall interference. This rule may be modified to have the eNB using a U subframe to perform receive beam blanking;
c. When both eNBs have a "o" in their respective reschedule flags for the conflict subframe, the eNB which is using a D subframe performs transmit beam blanking and reschedules the blanked UE(s) in the conflict subframe to subsequent frame(s).

These rules may be simply applied if there is one conflict subframe per frame since the reschedule flag only indicates if the UEs assigned to that particular subframe can be rescheduled. If the frame has multiple conflict subframes, the proposed rules above may be used for the first conflict subframe in the frame, while for subsequent conflict subframes in the frame, the rule a) may be applied, otherwise if rules b) and c) are encountered, the neighboring eNBs will take it in turn to perform blanking so that the rescheduling burden is shared by the neighboring eNBs.

In the case of transmit beam blanking, a subframe may be blanked out in its entirety. Alternatively, control and reference signals (e.g., PDCCH, CSI, CSI-RS, and the like) or a subset of control and reference signals normally transmitted in the subframe may still be transmitted in the blanked transmit beam direction. This technique may be referred to as almost blank transmit beams. Although transmitting the subset of the control signals may lead to some eNB to eNB interference, the location and value of the control signals are known at the receiving eNB and may be cancelled (e.g., using successive interference cancellation (SIC)) in a manner similar to almost blank subframes in Hetnets for LTE-A.

Figure 10:
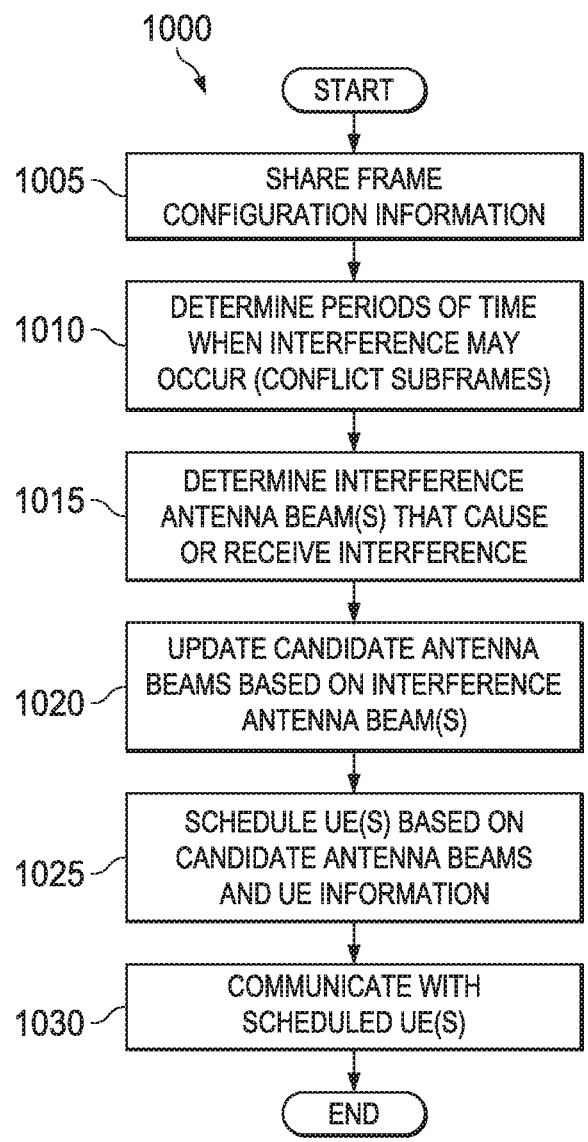
FIG. 10 illustrates a flow diagram of example operations 1000 occurring in an eNB communicating with UEs in accordance with example embodiments presented herein.

FIG. 10 illustrates an example flow diagram of example operations 1000 occurring in an eNB communicating with UEs. Operations 1000 may be indicative of operations occurring in an eNB, or equivalently, a base station, a nodeB, a controller, and so on, as the eNB communicates with UEs. In this situation, the eNB may be an example of a serving base station.

Operations 1000 begin with the eNBs of a communications system sharing frame configuration information (block 1005). The frame configuration information includes information regarding formats of frames and subframes. The eNBs may share the frame configuration information over direct eNB to eNB wireline links, and/or wireless links or may use the present X2 link. The communications may be performed inband or out of band. The eNBs may share the frame configuration information with a subset of other eNBs in the communications system, such as their immediate neighbor eNBs with adjacent sectors, and optionally the immediate neighbor eNBs (i.e., second degree neighbor eNBs) of their immediate neighbor eNBs, for example. The eNBs may share the frame configuration information all of the other eNBs in the communications system. The eNB determines periods of time (i.e. conflict subframes) during which interference may occur (block 1010). The eNB determines which interference antenna beam(s) may cause or receive the interference in accordance with the shared frame configuration information (block 1015). From the shared frame configuration information, the eNB may be able to determine which periods of time (conflict subframe) and which antenna beam(s) would either receive interference or cause interference. These antenna beam(s) may be referred to as interference antenna beam(s).

In addition, the eNB may determine if it is to perform beam blanking. As discussed previously, the eNB may make a decision to perform transmit beam and/or receive beam blanking since it would be inefficient for both an interfering eNB and an interfered eNB to perform beam blanking. As discussed earlier, the decision to perform beam blanking may be a fixed network-side decision, or a dynamic decision based on frame configurations of each sector, its respective neighbors, cell load, and the like. For discussion purposes, it is considered that the eNB determines that it is to perform beam blanking. The eNB updates a set of candidate antenna beams based on the interference antenna beam(s) for each conflict subframe in the frame (block 1020). The eNB may remove the interference antenna beams from a set of possible antenna beams to produce the set of candidate antenna beams. The set of candidate antenna beams for a particular conflict subframe includes antenna beams that have not been blanked or almost blanked in the conflict subframe. The set of candidate beams for a particular conflict subframe may include antenna beams that have either been blanked or almost blanked in other conflict subframes but not the particular conflict subframe. The eNB schedules UE(s) based on the sets of candidate beams (block 1025). The eNB may also use other information to schedule the UE(s), including presence of buffered data intended for certain UEs, transmission opportunity requests from certain UEs, UE priority, UE service history, network condition, and the like. The eNB communicates with the scheduled UE(s) (block 1030). The eNB may exchange transmissions with the scheduled UEs during corresponding subframes using antenna beams that are not blanked or almost blanked during the subframe.

Figure 11:
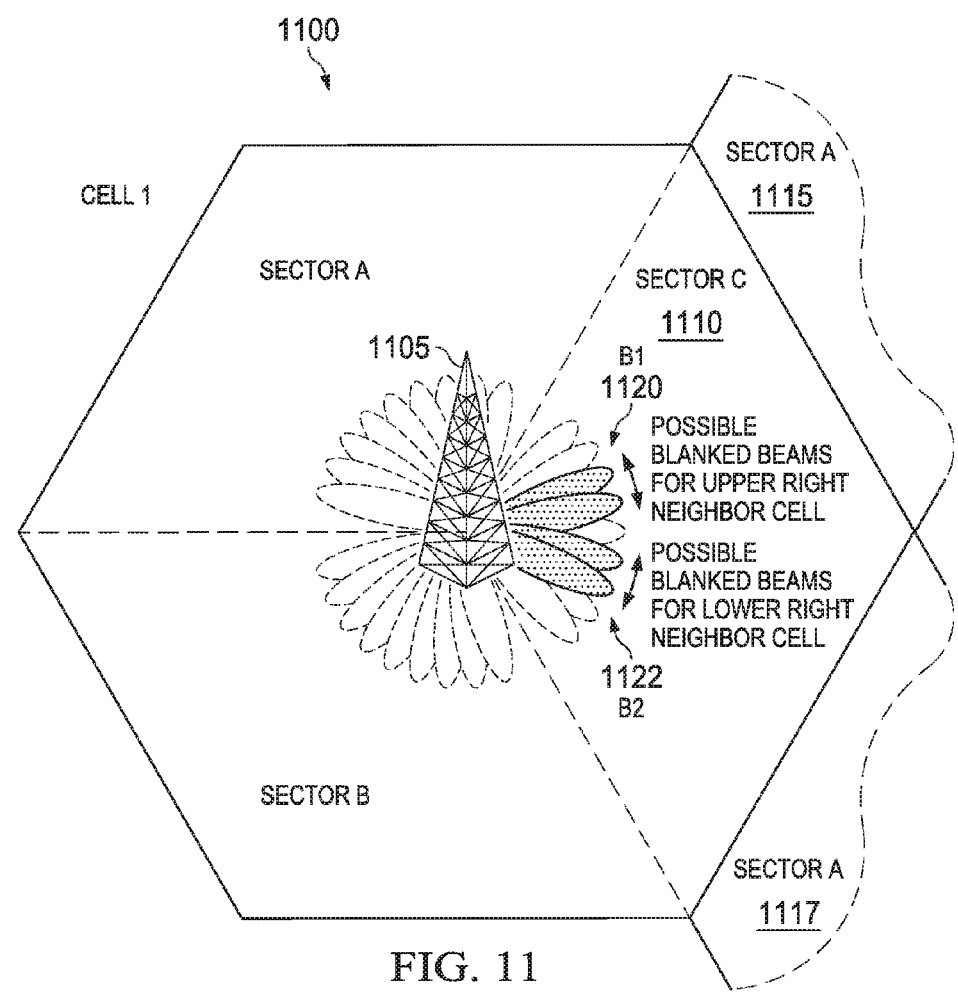
FIG. 11 illustrates an example mmWave communications system highlighting multiple adjacent beam blanking in accordance with example embodiments presented herein.

In the discussion above, as few as a single beam for transmit and/or receive beam blanking may be blanked out. However, depending on the codebook (or even non-codebook) used for transmission and/or reception or known propagation conditions, multiple adjacent beams may be blanked. FIG. 11 illustrates an example mmWave communications system 1100 highlighting multiple adjacent beam blanking. mmWave communications system 1100 includes an eNB 1105 with a coverage area labeled as cell 1. As shown in FIG. 11, beam sets B1 1120 and B2 1122 of sector C 1110 of cell 1 of eNB 1105 are possible sets of multiple adjacent beams that are potential blanked beams for sector A 1115 of upper right neighbor eNB and sector A 1117 of lower right neighbor eNB. Should transmissions to or from a UE using either set of multiple adjacent beams cause undue interference in either respective sector (sector A 1115 or sector A 1117), the beams in a corresponding set of multiple adjacent beams may be blanked or almost blanked.

The blanking of beams may also be defined as a range of angles and/or a power levels mask (for transmit beam blanking) or receiver gains (for receive beam blanking) to accommodate the use of an arbitrary antenna radiation pattern.

Although the discussion has focused on 2-dimensional beam blanking (azimuth beams), in the situation of 3-dimensional beamforming (and/or when adjacent eNBs are located at different heights/elevations), the blanking may also involve different elevation beams.

Multiple options are available for fixed and/or variable sets of blanked beams may be used. They include:

1. Fixed set of almost blanked transmit beams (still transmitting reference and control signals).
   When an eNB (e.g., eNB 1) is using a D subframe while a neighboring eNB (e.g., eNB 2) is using a U subframe, eNB 1 may blank a pre-determined fixed number of beams in the direction of eNB 2; and
   eNB 2 knows eNB 1 is using a D subframe during its U subframe, and it also knows the pre-determined fixed number of beams that eNB 1 is almost blanking, so eNB 2 knows to perform interference cancellation (IC) on received control and reference signals (e.g., CRS, PDCCH, CSI-RS, and the like) from the almost blank beams. No additional signaling may be required in this situation.

2. Fixed set of fully blanked transmit beams.
   Same as 1 except eNB 2 does not need to perform IC on received control signals; and
   No additional signaling may be required in this situation.

3. Variable set of transmit beams or receive beams blanked.
   If each eNB additionally signals an index of the beams that it intends to use for each subframe, more selective transmit and/or receive beam blanking may be performed (e.g., referring back to FIG. 7, where if only UE 5 730 (sector A 732 of cell 2 of eNB 707) was scheduled in a U subframe, no transmit beam blanking is needed at cell 1 towards cell 2, since the receive beam for UE 4 is not used). As an illustrative example, consider a situation with 16 beams directions per 120 degree sector, then 4 bits of additional signaling per subframe is needed (if only one beam is used per subframe) which equates to 40 bits per frame. The number of bits per subframe (or frame) would increase to 80, 120, and so on, if 2, 3, or more, users were scheduled per subframe; and
   This technique may be suitable for codebook based transmissions.

4. Variable set of transmit beams or receive beams blanked with physical resource block (PRB) information.
   If the mmWave communications system is using frequency division multiple access (FDMA), each eNB may additionally signal PRB indices corresponding to resources where it intends to schedule to UEs for each subframe. The PRB indices may be used in combination with the signaling of chosen beam indices. The signaling of the PRB indices may be in the form of a bit word (where the length of the bit word corresponds to the maximum number of resource blocks (RBs), e.g., 50 for a 3GPP LTE compliant communications system) and a bit entry in the bit word set to a first value (e.g., 1) indicates an RB that is scheduled to a UE and to a second value (e.g., 0) indicates an RB that is not scheduled to a UE). The bit word may also be referred to as a bitmap.

The signaling of the PRB indices allows for a more selective choice of blanked beams by the eNB that is performing the blanking. As an illustrative example, in a situation where the mmWave communications system is using FDMA and an interfering eNB (the eNB making a transmission in a D subframe) and an interfered eNB (the eNB making a reception in a U subframe) are using different PRBs in the conflict subframe, then it may not be necessary to perform beam blanking since the transmission and the reception do not occur in the same PRB. If time division multiple access (TDMA) is being used (where each UE could be assigned the whole system bandwidth), the signaling of the PRB indices are not needed.

4. Signaling of switching of fully blank transmit beams to almost blank transmit beams.
   If each eNB would like to switch between fully blank transmit beams to almost blank transmit beams (or vice versa), the eNB may signal to neighbor eNBs a 1 bit almost blanking flag (or alternatively a 1 bit blanking flag) so neighbor eNBs know whether to perform interference cancellation (IC) on received control/reference signals or not; and
   The almost blanking flag may be signaled once per frame (1 bit per frame) or for each D subframe (up to 8 bits per frame).

Figure 12:
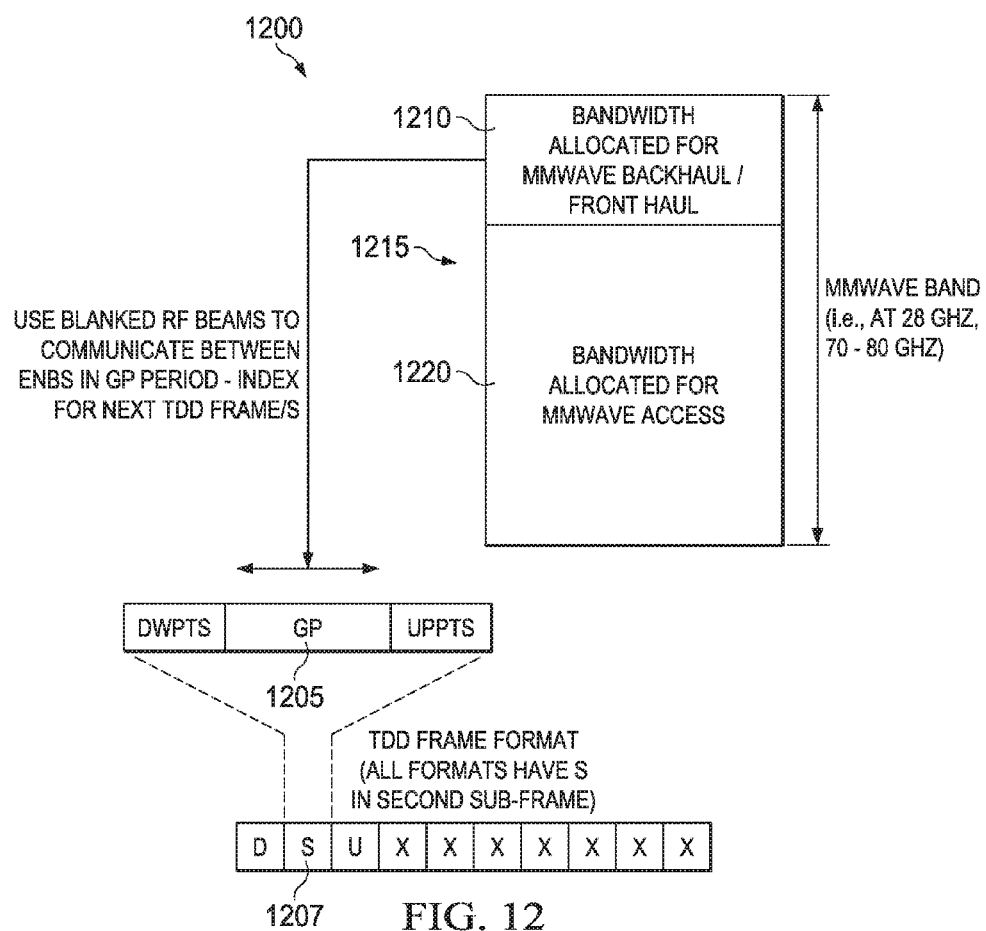
FIG. 12 illustrates an example TDD frame format for signaling control information between eNBs using a dedicated connection in accordance with example embodiments presented herein.

FIG. 12 illustrates an example TDD frame format 1200 for signaling frame configuration information between eNBs using a dedicated connection (as opposed to using the more conventional X2 link). As shown in FIG. 12, a guard period (GP) 1205 in an S subframe 1207 may be used in conjunction with the blanked beams to communicate the frame configuration information between eNBs which may advantageously re-use the beam-forming hardware since no data is transmitted at this time. The frame configuration information may include the chosen TDD frame configuration and one or more of the following:
   a set of beam indices used;
   an almost blank flag(s) bit; and
   a reschedule flag(s).

The frame configuration information may be transmitted in a first portion 1210 of an overall mmWave band 1215 which is allocated for backhaul/front haul use, while a second portion 1220 is allocated for access. This will be referred to as out of band signaling. In addition to or as an alternative to the reuse of bandwidth available in the blanked subframes, the backhaul X2 interface may be used to signal this control information.

FIG. 12 also illustrates out of band signaling (although still within overall band(s) 1215) with any frame format (TDD and/or FDD (as shown in FIG. 12)). Existing beam-forming hardware may be reused in the GP of S subframes, such as S subframe 1207, of TDD frames. Inband signaling (using the second portion 1220) may also be used in the S subframes of TDD frames.

Figure 13:
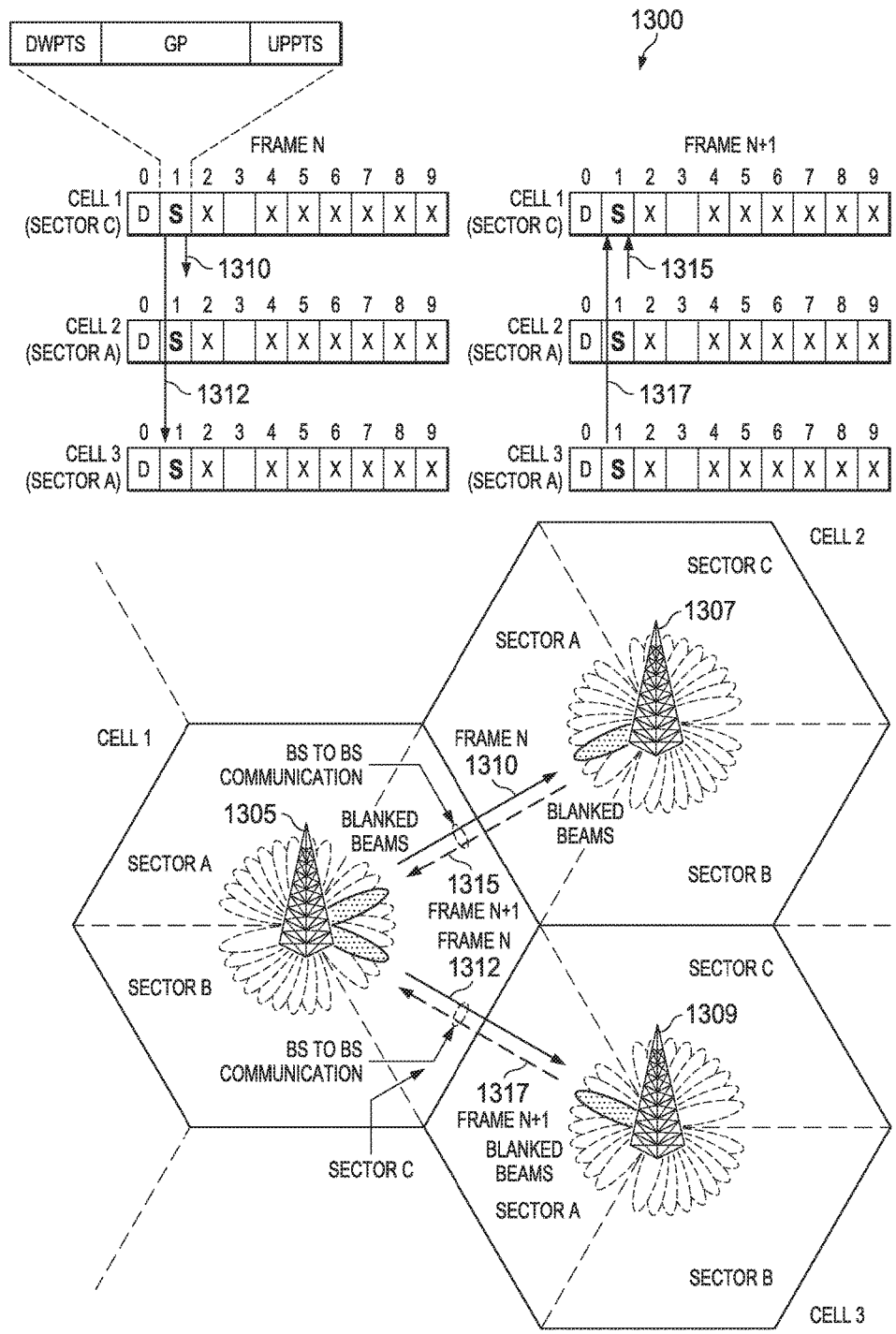
FIG. 13 illustrates an example mmWave communications system highlighting inband (or out of band re-using the beam-forming hardware) control signaling in accordance with example embodiments presented herein.

FIG. 13 illustrates an example mmWave communications system 1300 highlighting frame configuration signaling using inband (or out of band re-using the beam-forming hardware) signaling. As shown in FIG. 13, such signaling makes use of the GP of the S subframe in a toggle fashion to communicate with an eNB of an adjacent sector. In order to use signaling in such a way, each eNB may need to send information regarding the next 2 subsequent frame configurations that it will use. mmWave communications system 1300 includes a plurality of eNBs, such as 1305 with coverage area cell 1, 1307 with coverage area cell 2, and 1309 with coverage area cell 3, serving a plurality of UEs. In an S subframe of frame N, eNB 1305 communicates with eNBs 1307 and 1309 (shown as arrows 1310 and 1312). Then, in an S subframe of frame N+1, eNBs 1307 and 1309 communicate with eNB 1305 (shown as arrows 1315 and 1317). Other possible communications combinations between involved eNBs are possible.

Figure 14:
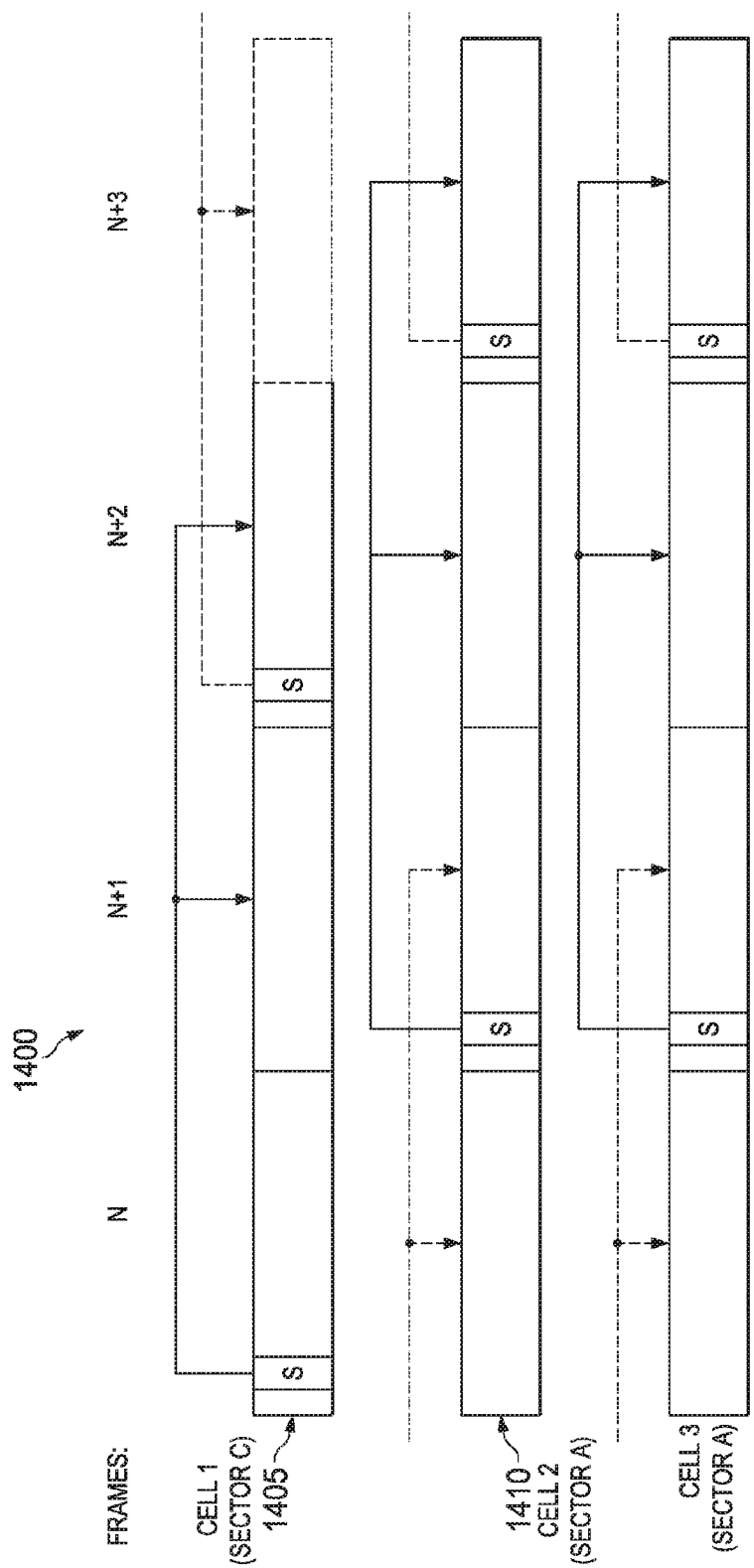
FIG. 14 illustrates a sequence of frames for neighboring cells used to for inband eNB communications in accordance with example embodiments presented herein.

FIG. 14 illustrates a sequence of frames 1400 for neighboring cells used to for inband eNB communications. As shown in FIG. 14, the eNBs for each sector sends to its neighboring sectors information for the next 2 subsequent frame configurations that it will use. As an example, the eNB of cell 11405 sends at frame N the frame configuration information of frames N+1, and N+2 to eNBs of neighboring cells, while the eNB of cell 2 1410 sends at frame N+1 the frame configuration information of frames N+2, and N+3 to eNBs of neighboring cells. Alternatively, eNBs of adjacent sectors in adjacent cells may agree in advance a sequence of transmitting and receiving TDD frame formats to help reduce signaling overhead.

The example embodiments previously presented focused on avoiding eNB to eNB interference under an assumption that UE to UE interference is minimal and can be ignored. However, there are situations where UE to UE interference in conflict subframes may be significant. As an example, UEs that are operating near the cell edges of adjacent cells may suffer from UE to UE interference.

Figure 15:
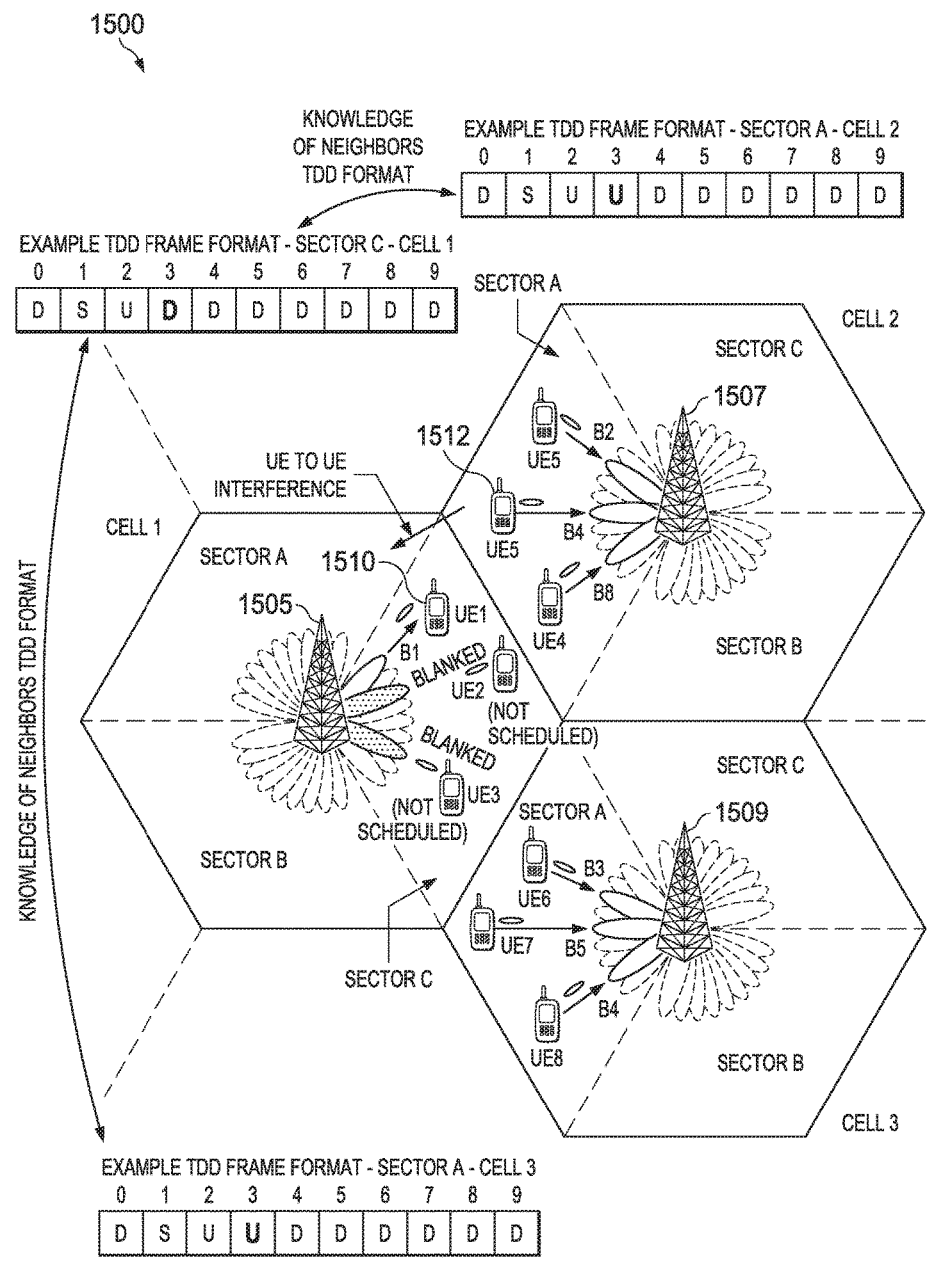
FIG. 15 illustrates an example mmWave communications system highlighting UE to UE interference in accordance with example embodiments presented herein.

FIG. 15 illustrates an example mmWave communications system 1500 highlighting UE to UE interference. mmWave communications system 1500 includes a plurality of eNBs, 1505, 1507, and 1509, each serving a plurality of UEs. As shown in FIG. 15, UE 1 1510 and UE 5 1512 may suffer from UE to UE interference. UE 1 1510 is receiving a transmission from eNB 1505 while UE 2 1512 is transmitting a transmission to eNB 1507. If the two UEs are sufficiently close to one another, the transmission from UE 2 1512 may cause interference at UE 11510.

According to an example embodiment, when the eNB which is performing beam blanking (either transmit or receive) serves a UE with low reference signal receive power (RSRP) or low reference signal receive quality (RSRQ), (which are generally associated with UEs that are located at cell edges), in a conflict subframe, the eNB also blanks beam(s) for the UE. The RSRP and RSRQ can be measurements fedback to the eNB by the UEs scheduled in downlink subframes (i.e., UE 1) but can also be measurement made by the eNB for UEs scheduled in uplink subframes (i.e., UE 5).

According to an example embodiment, when eNBs are sharing frame configuration information, the eNBs exchange indicators of intention to serve cell edge UEs. The indicators are two valued indicators (e.g., one bit) and may be referred to as low RSRP flags. The indicators may be associated with each subframe, therefore, for an 8 subframe frame, there are 8 low RSRP flags. Therefore, if an eNB and its neighboring eNB both have low RSRP flags set to not serve cell edge UEs in a conflict subframe, the eNB performing beam blanking will also blank out beam(s) to the cell edge UEs. The use of the low RSRP flags allows for the blanking of cell edge UEs only when both involved eNBs are serving cell edge UEs in conflict subframes.

According to an example embodiment, in situations where the mmWave communications system is using FDMA the PRBs of each subframe assigned for communications may be also be additionally indicated in the frame configuration information. The assigned PRBs of a subframe may be indicated using bit words in a manner similar to that previously discussed. Therefore if an eNB and it neighboring eNB both have overlapping PRB in a conflict subframe where cell edge UEs are to be scheduled, the blanking eNB will blank beams for these UEs. If the PRB of the eNB and the neighboring are not overlapping in the conflict subframe, the cell edge UEs are using different resources and the blanking for these cell edge UEs is not required.

Figure 16:
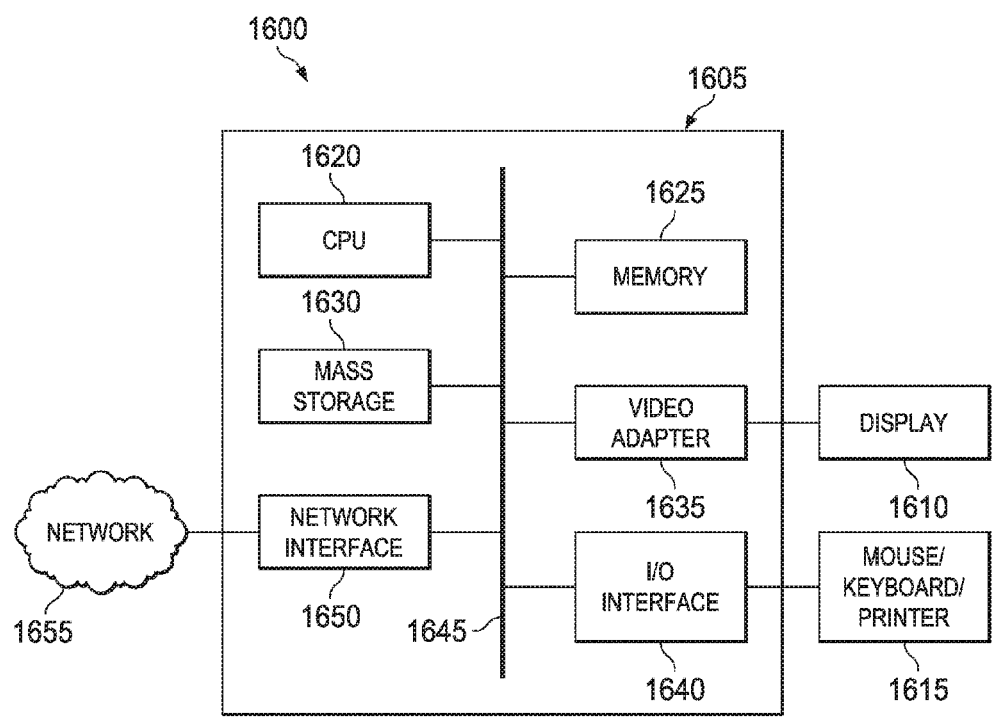
FIG. 16 illustrates a computing platform that may be used for implementing, for example, the devices and methods described herein, in accordance with an embodiment.

FIG. 16 is a block diagram of a processing system 1600 that may be used for implementing the devices and methods disclosed herein. In some embodiments, the processing system 1600 comprises a UE. In other embodiments, the processing system 1600 comprises a base station. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit 1605 equipped with one or more input/output devices, such as a human interface 1615 (including speaker, microphone, mouse, touchscreen, keypad, keyboard, printer, and the like), display 1610, and so on. The processing unit may include a central processing unit (CPU) 1620, memory 1625, a mass storage device 1630, a video adapter 1635, and an I/O interface 1640 connected to a bus 1645.

The bus 1645 may be one or more of any type of several bus architectures including a memory bus or memory controller, a peripheral bus, video bus, or the like. The CPU 1620 may comprise any type of electronic data processor. The memory 1625 may comprise any type of system memory such as static random access memory (SRAM), dynamic random access memory (DRAM), synchronous DRAM (SDRAM), read-only memory (ROM), a combination thereof, or the like. In an embodiment, the memory 1625 may include ROM for use at boot-up, and DRAM for program and data storage for use while executing programs.

The mass storage device 1630 may comprise any type of storage device configured to store data, programs, and other information and to make the data, programs, and other information accessible via the bus 1645. The mass storage device 1630 may comprise, for example, one or more of a solid state drive, hard disk drive, a magnetic disk drive, an optical disk drive, or the like.

The video adapter 1635 and the I/O interface 1640 provide interfaces to couple external input and output devices to the processing unit 1600. As illustrated, examples of input and output devices include the display 1610 coupled to the video adapter 1635 and the mouse/keyboard/printer 1615 coupled to the I/O interface 1640. Other devices may be coupled to the processing unit 1605, and additional or fewer interface devices may be utilized. For example, a serial interface such as Universal Serial Bus (USB) (not shown) may be used to provide an interface for a printer.

The processing unit 1605 also includes one or more network interfaces 1650, which may comprise wired links, such as an Ethernet cable or the like, and/or wireless links to access nodes or different networks 1655. The network interface 1650 allows the processing unit 1605 to communicate with remote units via the networks 1655. For example, the network interface 1650 may provide wireless communication via one or more transmitters/transmit antennas and one or more receivers/receive antennas. In an embodiment, the processing unit 1605 is coupled to a local-area network or a wide-area network 1655 for data processing and communications with remote devices, such as other processing units, the Internet, remote storage facilities, or the like.

Advantageous features of example embodiments may include: Cellular communications system operating in time division duplex (TDD) mode, in which each base station (or eNodeB) serving a cell is using beam-forming for transmission and/or reception and has knowledge of its neighbors chosen TDD frame format, and furthermore schedules the use of its own beams (for transmission, reception or both) based on its chosen TDD frame format and knowledge of its neighbors chosen frame format.

The example embodiments may further include the system above where each base station does not use a certain set of beams for transmission ("Tx blanked beams") during a downlink subframe ("D") when a base station in a neighbor cell is using a uplink subframe ("U") at the same time (so called "conflict" subframe).

The example embodiments may further include the system above where each base station does not use a certain set of beams for reception ("Rx blanked beams") during an uplink subframe ("U") when a base station in a neighbor cell is using a downlink subframe ("D") at the same time (so called "conflict" subframe).

The example embodiments may further include the system above where the beams may be formed in the azimuth direction, the elevation direction or both.

The example embodiments may further include the system above where the blanked beams are not used for data transmission, but are still used for transmission of control signals hereafter called "almost" blank Tx beams.

The example embodiments may further include the system above where each BS also has additional knowledge of the chosen beam forming indices for each subframe of its neighbors chosen TDD frame format.

The example embodiments may further include the system above where each BS uses the knowledge of the beam forming indices of its neighbor for each subframe to determine its certain set of Tx blanked beams.

The example embodiments may further include the system above where each BS uses the knowledge of the beam forming indices of its neighbor for each subframe to determine its certain set of Rx blanked beams.

The example embodiments may further include the system above where each BS also has additional knowledge of its neighbors bit blanking flag(s) which indicates if a given BS will perform a blanked Tx beam or an almost blank Tx beam during a downlink ("D") subframe when a given neighbor is using an uplink "U" subframe. They could be one flag per subframe or one flag per frame.

The example embodiments may further include the system above where each BS also has additional knowledge of its neighbors reschedule flags for each subframe which indicate if a given BS can reschedule the users assigned to each subframe to another subframe in the same frame, if the BS was required to perform Tx or Rx beam blanking.

The example embodiments may further include the system above where each base station is informed of its neighbors chosen TDD format via a backhaul interface (i.e., X2 interface).

The example embodiments may further include the system above where each base station is informed of its neighbors beam forming indices via a backhaul interface (i.e., X2 interface).

The example embodiments may further include the system above where each base station is informed of its neighbors bit blanking flag(s) via a backhaul interface (i.e., X2 interface).

The example embodiments may further include the system above where each base station is inform of its neighbors reschedule flags for each subframe via a backhaul interface (i.e., X2 interface).

The example embodiments may further include the system above where each base station is informed of its neighbors chosen TDD frame configuration via base station to base station communication using the blanked transmitter and blanked receiver beams of each respective base station.

The example embodiments may further include the system above where each base station is informed of its neighbors beam forming indices for each subframe of their chosen TDD frame configuration via base station to base station communication using the blanked transmitter and blanked receiver beams of each respective base station.

The example embodiments may further include the system above where each base station is informed of its neighbors bit blanking flag(s) via base station to base station communication using the blanked transmitter and blanked receiver beams of each respective base station.

The example embodiments may further include the system above where each base station is informed of its neighbors reschedule flag(s) for each subframe via base station to base station communication using the blanked transmitter and blanked receiver beams of each respective base station.

The example embodiments may further include the system above where the base station to base station communication takes place during the guard time of the special frame ("S") in the TDD frame.

The example embodiments may further include the system above where each communicating base station either transmits its information or receives neighbors' information for at least the next two frames in an alternating way.

The example embodiments may further include the system above where each communicating base station either transmits its information or receives neighbors' information for at least the next two frames in an alternating way.

The example embodiments may further include the system above where the set of blank TX beams (in terms of indices or range of angles) at each base station are known at neighbor receiving base station(s).

The example embodiments may further include the system above where the set of blank Rx beams (in terms of indices or range of angles) at each base station are known at neighbor transmitting base station(s).

The example embodiments may further include the system above where the decision to perform TX beam blanking or RX beam blanking in a "conflict" subframe may be a fixed network decision.

The example embodiments may further include the system above where the decision to perform TX beam blanking (claim 2) or RX beam blanking (claim 3) in a "conflict" subframe may be a dynamic decision based on certain information about the loading information and/or the base stations ability to reschedule users from blanked subframe to other subframes in the same frame.

The example embodiments may further include the system above where each base station uses the knowledge of its own rescheduling flags and its neighbors rescheduling flags to decide to perform Tx beam blanking or Rx beam blanking for a "conflict" subframe in accordance with a certain rule.

The example embodiments may further include the system above where the rule is that if only one base station indicates via its reschedule flag that a reschedule is possible, that base station will perform the blanking. If that base station is performing an uplink subframe ("U") it will perform Rx beam blanking, otherwise it will perform Tx Beam blanking. If both base stations indicate via their reschedule flags that a reschedule is possible, or both indicate that a reschedule is not possible, the base station performing the downlink subframe ("D") will perform Tx beam blanking.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for communicating in a communications system using beamformed transmissions, the method comprising:
    blanking, by a serving base station (SBS), an interference antenna beam of a plurality of available antenna beams, wherein one of the plurality of available antenna beams causes interference to or receives interference from at least one neighboring base station during a conflict time interval of a frame, wherein the blanking is in accordance with configuration information comprising frame configuration information received from the at least one neighboring base station and frame configuration information of the SBS, thereby producing a plurality of candidate antenna beams;
    scheduling, by the SBS, transmission opportunities for user equipments (UEs) in the conflict time interval on the plurality of candidate antenna beams; and
    communicating, by the SBS, with scheduled UEs using the transmission opportunities.

2. The method of claim 1, wherein there is a plurality of conflict time intervals, and wherein the blanking, the scheduling, and the communicating are performed for each conflict time interval in the plurality of conflict time intervals.

3. The method of claim 1, further comprising exchanging the configuration information with the at least one neighboring base station.

4. The method of claim 1, wherein the communications system is operating in a time division duplex (TDD) mode.

5. The method of claim 4, wherein the configuration information further comprises information regarding TDD frame formats selected by the SBS and selected by the at least one neighboring base station, wherein the TDD frame formats specify arrangements of downlink and uplink time intervals of the frame.

6. The method of claim 1, wherein the conflict time interval is a subframe or a subset of the frame.

7. The method of claim 1, wherein blanking the interference antenna beam of the plurality of available antenna beams comprises:
    determining the conflict time interval of the frame;
    selecting an antenna beam of the plurality of available antenna beams that is oriented towards the at least one neighboring base station during the conflict time interval; and
    blanking the selected antenna beam.

8. The method of claim 7, wherein the conflict time interval comprises a portion of the frame wherein the SBS is transmitting in a downlink and the at least one neighboring base station is receiving in an uplink during a corresponding portion of its frame.

9. The method of claim 7, wherein the conflict time interval comprises a portion of the frame wherein the SBS is receiving in an uplink and the at least one neighboring base station is transmitting in a downlink during a corresponding portion of its frame.

10. The method of claim 1, further comprising:
    communicating control or reference information using the blanked interference antenna beam.

11. The method of claim 1, wherein the configuration information further comprises knowledge of antenna beams associated with the SBS and the at least one neighboring base station for time intervals of the frame.

12. The method of claim 11, wherein the time intervals are subframes or subsets of the frame.

13. The method of claim 1, wherein the configuration information further comprises a reschedule indicator indicating an ability of the SBS and the at least one neighboring base station to reschedule use of the interference antenna beam and corresponding scheduled UEs for time intervals of the frame.

14. The method of claim 13, wherein the time intervals are subframes or subsets of the frame.

15. The method of claim 1, wherein the configuration information further comprises indications of physical resource blocks (PRB) associated with the transmission opportunities for the SBS and the at least one neighboring base station for time intervals of the frame.

16. The method of claim 15, wherein the time intervals are subframes or subsets of the frame.

17. The method of claim 1, wherein the configuration information further comprises a blanking flag indicating if the interference antenna beam is blanked for data or blanked for all signals for the SBS.

18. The method of claim 1, further comprising blanking a plurality of interference antenna beams oriented in substantially a same direction as the interference antenna beam.

19. The method of claim 1, wherein the configuration information is received using the interference antenna beam.

20. The method of claim 19, wherein the configuration information is received during a guard period of the frame.

21. The method of claim 1, further comprising blanking an additional antenna beam of the plurality of available antenna beams that is oriented towards a cell edge UE.

22. A method for communicating in a communications system using beamformed transmission, the method comprising:
    determining, by a serving base station (SBS), at least one antenna beam from a plurality of antenna beams, wherein one of the plurality of antenna beams causes interference to or receives interference from a neighbor base station during a conflict time interval, wherein the determining is in accordance with configuration information including frame configuration information received from the neighboring base station and frame configuration information of the SBS;
    eliminating, by the SBS, the at least one antenna beam from the plurality of antenna beams, thereby producing a plurality of candidate antenna beams;
    scheduling, by the SBS, user equipments (UEs) using the plurality of candidate antenna beams; and
    communicating, by the SBS, with scheduled UEs using a subset of the plurality of candidate antenna beams.

23. The method of claim 22, further comprising exchanging the configuration information with the neighboring base station.

24. A serving base station (SBS) comprising:
a memory storage comprising instructions; and
a processor in communication with the memory storage, wherein the processor executes the instructions to:
blank an interference antenna beam of a plurality of available antenna beams, wherein one of the plurality of available antenna beams causes interference to or receives interference from at least one neighboring base station during a conflict time interval of a frame, wherein the interference antenna beam is blanked in accordance with configuration information comprising frame configuration information received from the at least one neighboring base station and frame configuration information of the SBS, thereby producing a plurality of candidate antenna beams;
schedule transmission opportunities for user equipments (UEs) in the conflict time interval on the plurality of candidate antenna beams; and
communicate with scheduled UEs using the transmission opportunities.

25. The SBS of claim 24, wherein the processor executes the instructions to determine the conflict time interval of the frame, to select an antenna beam of the plurality of available antenna beams that is oriented towards the at least one neighboring base station during the conflict time interval, and to blank the selected antenna beam.

26. The SBS of claim 24, wherein the processor executes the instructions to blank a plurality of interference antenna beams oriented in substantially a same direction as the interference antenna beam.

27. The SBS of claim 24, wherein the processor executes the instructions to blank an additional antenna beam of the plurality of available antenna beams that is oriented towards a cell edge UE.

28. The SBS of claim 24, wherein the processor executes the instructions to receive the configuration information using the interference antenna beam.

29. The SBS of claim 28, wherein the configuration information is received during a guard period of the frame.

* * * * *